United States Patent
Schmier et al.

(10) Patent No.: US 9,436,397 B2
(45) Date of Patent: Sep. 6, 2016

(54) VALIDATING THE STATUS OF MEMORY OPERATIONS

(71) Applicant: SanDisk Enterprise IP LLC, Milpitas, CA (US)

(72) Inventors: Jacob B. Schmier, Gilbert, AZ (US); Todd G. Lindberg, Phoenix, AZ (US); Andrew D. Prosory, Queen Creek, AZ (US)

(73) Assignee: SANDISK TECHNOLOGIES LLC., Plano, TX (US)

( * ) Notice: Subject to any disclaimer, the term of this patent is extended or adjusted under 35 U.S.C. 154(b) by 107 days.

(21) Appl. No.: 14/596,182

(22) Filed: Jan. 13, 2015

(65) Prior Publication Data

US 2016/0085465 A1    Mar. 24, 2016

Related U.S. Application Data

(60) Provisional application No. 62/054,051, filed on Sep. 23, 2014.

(51) Int. Cl.
*G06F 12/00* (2006.01)
*G06F 3/06* (2006.01)

(52) U.S. Cl.
CPC ............. *G06F 3/0619* (2013.01); *G06F 3/061* (2013.01); *G06F 3/0653* (2013.01); *G06F 3/0659* (2013.01); *G06F 3/0679* (2013.01)

(58) Field of Classification Search
CPC .... G06F 3/0619; G06F 3/0659; G06F 3/061; G06F 3/0679; G06F 3/0653
See application file for complete search history.

(56) References Cited

U.S. PATENT DOCUMENTS 5,559,988 A   9/1996  Durante et al.
5,909,559 A   6/1999  So
(Continued)

FOREIGN PATENT DOCUMENTS

EP            0 376 285 A2    7/1990
WO      WO 2012/083308       6/2012

OTHER PUBLICATIONS

International Search Report and Written Opinion dated Nov. 18, 2015, received in International Patent Application No. PCT/US2015/039552 which corresponds to U.S. Appl. No. 14/559,183, 11 pages (Ellis).

(Continued)

*Primary Examiner* — John A Lane
(74) *Attorney, Agent, or Firm* — Morgan, Lewis & Bockius LLP

(57) ABSTRACT

The various implementations described herein include systems, methods and/or devices used to validate the status of memory operations in a storage device. In one aspect, the method includes sending a first set of command instructions to a first device of the plurality of non-volatile memory devices, including: a memory operation command; a first status polling command to determine a status of the first device, and a second status polling command to determine a status of the first device. The first status polling command is sent after the memory operation command is sent, and the second status polling command is sent after receiving a response to the first status polling command that meets predefined completion criteria. The method further includes forgoing sending any subsequent set of command instructions to the first device until a response to the second status polling command that meets the predefined completion criteria is received.

25 Claims, 10 Drawing Sheets

(56) References Cited

U.S. PATENT DOCUMENTS

| | | |
|---|---|---|
| 6,247,136 B1 | 6/2001 | MacWilliams et al. |
| 6,292,410 B1 | 9/2001 | Yi et al. |
| 6,401,213 B1 | 6/2002 | Jeddeloh |
| 6,449,709 B1 | 9/2002 | Gates |
| 8,122,202 B2 | 2/2012 | Gillingham |
| 8,825,967 B2 | 9/2014 | Beom |
| 2003/0115403 A1 | 6/2003 | Bouchard et al. |
| 2003/0122834 A1 | 7/2003 | Mastronarde et al. |
| 2007/0233937 A1 | 10/2007 | Coulson et al. |
| 2008/0140914 A1 | 6/2008 | Jeon |
| 2009/0168525 A1 | 7/2009 | Olbrich et al. |
| 2010/0005217 A1 | 1/2010 | Jeddeloh |
| 2010/0014364 A1 | 1/2010 | Laberge et al. |
| 2010/0174853 A1 | 7/2010 | Lee et al. |
| 2010/0250874 A1 | 9/2010 | Farrell et al. |
| 2011/0264851 A1 | 10/2011 | Jeon et al. |
| 2011/0302474 A1 | 12/2011 | Goss et al. |
| 2013/0070507 A1 | 3/2013 | Yoon |
| 2013/0132650 A1 | 5/2013 | Choi et al. |
| 2013/0219106 A1 | 8/2013 | Vogan et al. |
| 2013/0254498 A1 | 9/2013 | Adachi et al. |
| 2014/0047170 A1 | 2/2014 | Cohen et al. |
| 2014/0229655 A1 | 8/2014 | Goss et al. |
| 2014/0229656 A1 | 8/2014 | Goss et al. |
| 2014/0241071 A1 | 8/2014 | Goss et al. |
| 2014/0244897 A1 | 8/2014 | Goss et al. |
| 2014/0310241 A1 | 10/2014 | Goyen |
| 2016/0170831 A1* | 6/2016 | Lesartre .............. G06F 11/1068 714/764 |

OTHER PUBLICATIONS

International Search Report and Written Opinion dated Nov. 9, 2015, received in International Patent Application No. PCT/US2015/053551, which corresponds to U.S. Appl. No. 14/668,690, 12 pages (Thangaraj).

International Search Report and Written Opinion dated Nov. 11, 2015, received in International Patent Application No. PCT/US2015/053582, which corresponds to U.S. Appl. No. 14/659,493, 12 pages (Prins).

* cited by examiner

VALIDATING THE STATUS OF MEMORY OPERATIONS

RELATED APPLICATIONS

This application claims priority to U.S. Provisional Patent Application No. 62/054,051, filed Sep. 23, 2014, which is hereby incorporated by reference in its entirety.

TECHNICAL FIELD

The disclosed embodiments relate generally to memory systems, and in particular, to validating the status of memory operations in a storage device.

BACKGROUND

Semiconductor memory devices, including flash memory, typically utilize memory cells to store data as an electrical value, such as an electrical charge or voltage. A flash memory cell, for example, includes a single transistor with a floating gate that is used to store a charge representative of a data value. Flash memory is a non-volatile data storage device that can be electrically erased and reprogrammed. More generally, non-volatile or persistent memory (e.g., flash memory, as well as other types of non-volatile memory implemented using any of a variety of technologies) retains stored information even when not powered, as opposed to volatile memory, which requires power to maintain the stored information.

Command instructions sent to a non-volatile data storage device are used for performing memory operations, such as writing data to, reading data form, and erasing data stored in flash memory of the non-volatile data storage device. Ascertaining an accurate status of the storage device with respect to memory operations, for example, ascertaining whether a memory operation has completed, is necessary to ensure proper operation and endurance of the storage device.

SUMMARY

Various implementations of systems, methods and devices within the scope of the appended claims each have several aspects, no single one of which is solely responsible for the attributes described herein. Without limiting the scope of the appended claims, after considering this disclosure, and particularly after considering the section entitled "Detailed Description" one will understand how the aspects of various implementations are used to validate the status of memory operations at a storage device. In one aspect, a first set of command instructions is sent to a first device of a plurality of non-volatile memory devices, including a memory operation command, a first status polling command, and second status polling command. Sending any subsequent set of command instructions to the first device is foregone until a response to the second status polling command that meets the predefined completion criteria is received.

BRIEF DESCRIPTION OF THE DRAWINGS

So that the present disclosure can be understood in greater detail, a more particular description may be had by reference to the features of various implementations, some of which are illustrated in the appended drawings. The appended drawings, however, merely illustrate the more pertinent features of the present disclosure and are therefore not to be considered limiting, for the description may admit to other effective features.

Figure 1:
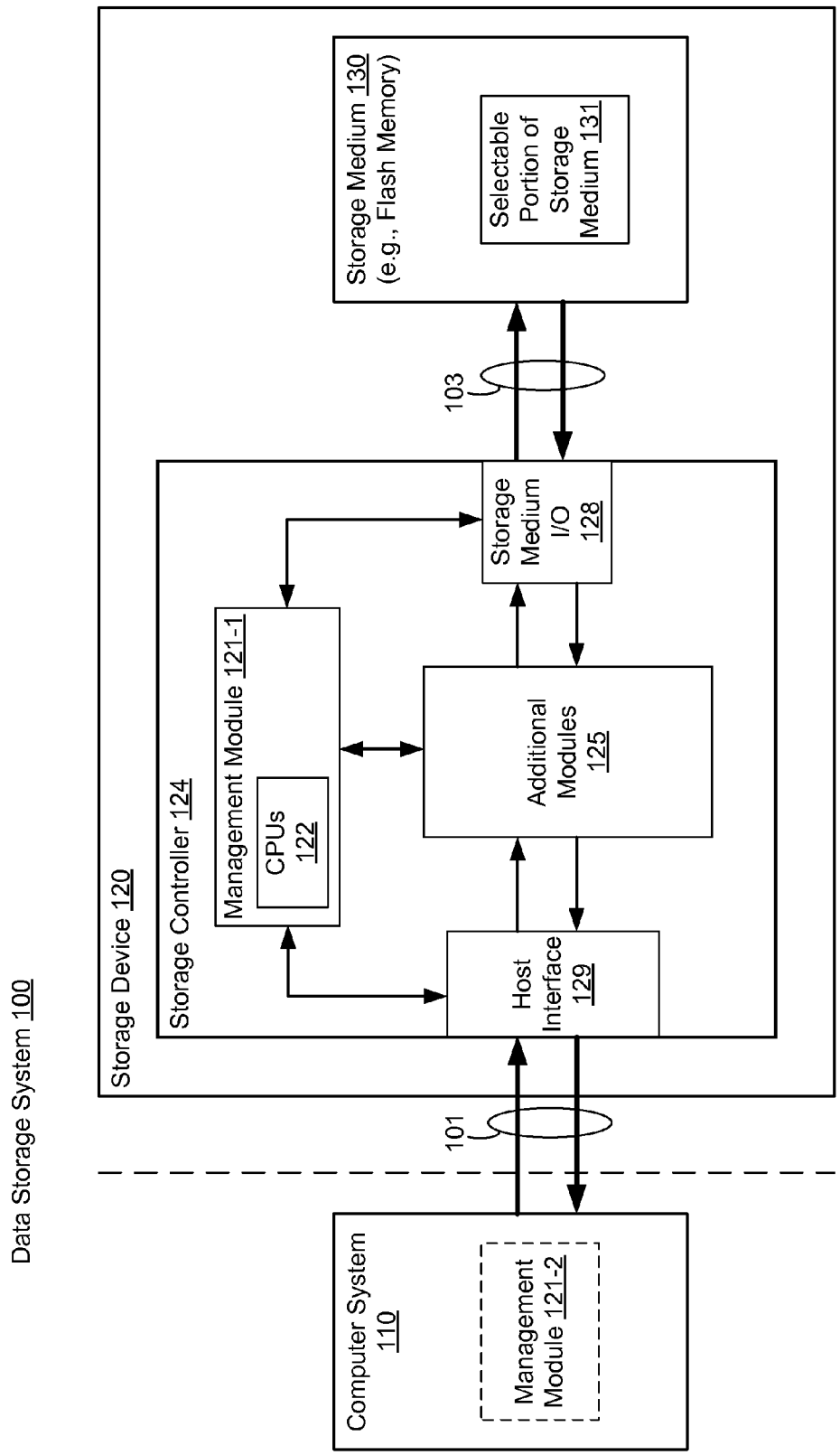
FIG. 1 is a block diagram illustrating an implementation of a data storage system, in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The various implementations described herein include systems, methods and/or devices used to validate the status of memory operations at a storage device. Some implementations include systems, methods and/or devices to send a first set of command instructions including a memory operation command, a first status polling command, and second status polling command, and to forego sending any subsequent set of command instructions until a response to the second status polling command that meets the predefined completion criteria is received.

More specifically, some implementations include a method of operating a storage device including a plurality of non-volatile memory devices. The method includes, at a storage device, sending a first set of command instructions to a first device of the plurality of non-volatile memory devices, the first set of command instructions including: a memory operation command which, when executed, operates on the first device; a first status polling command to determine a status of the first device; and a second status polling command to determine a status of the first device. Furthermore, the first status polling command is sent to the first device after the memory operation command is sent to the first device, and the second status polling command is sent to the first device after receiving a response to the first status polling command that meets predefined completion criteria. The method further includes forgoing sending any subsequent set of command instructions to the first device until a response to the second status polling command that meets the predefined completion criteria is received.

In some embodiments, the method further includes performing a remedial action in accordance with a determination that the response to the second status polling command that meets the predefined completion criteria includes a predefined error indication. In some embodiments, the method further includes performing a remedial action in accordance with a determination that the response to the second status polling command that meets the predefined completion criteria includes a predefined error indication, without regard to whether the response to the first status polling command that meets the predefined completion criteria includes the predefined error indication. In some embodiments, the remedial action includes changing an operational status of a respective block of non-volatile memory in the first device.

In some embodiments, sending the memory operation command to the first device includes sending a set of one or more memory operation commands to the first device, and the response to the first status polling command includes a first operation completion status with respect to the set of one or more memory operation commands and a first failure status with respect to the set of one or more memory operation commands.

In some embodiments, the response to the second status polling command includes a second operation completion status with respect to the set of one or more memory operation commands and a second failure status with respect to the set of one or more memory operation commands, and the response to the second status polling command meets the predefined completion criteria when (A) the second operation completion status indicates that execution of the set of one or more memory operation commands is completed, or (B) the second failure status indicates that execution of at least one of the one or more memory operation commands failed.

In some embodiments, sending the first status polling command to the first device includes iteratively sending the first status polling command to the first device until the response to the first status polling command meets the predefined completion criteria. In some embodiments, sending the second status polling command to the first device includes iteratively sending the second status polling command to the first device until the response to the second status polling command meets the predefined completion criteria.

In some embodiments, sending the memory operation command to the first device includes sending a set of one or more memory operation commands to the first device. Furthermore, in accordance with a determination that the received response to the first status polling command includes a first failure status indicating that at least one memory operation command of the set of one or more memory operation commands failed, and in accordance with a determination that the received response to the second status polling command includes a second failure status indicating that none of the set of one or more memory operation commands failed; the method includes determining that the received response to the first operation status command was erroneous.

In some embodiments, sending the memory operation command to the first device includes sending a set of one or more memory operation commands to the first device. Furthermore, in accordance with a determination that the received response to the first status polling command includes a first failure status indicating that none of the set of one or more memory operation commands failed, and the received response to the second status polling command includes a second failure status indicating that at least one memory operation command of the set of one or more memory operation commands failed, the method includes determining that the received response to the first operation status command was erroneous.

In some embodiments, the memory operation command includes: a read command for reading data from non-volatile memory of the first device; a write command for writing data to the non-volatile memory of the first device; or an erase command for erasing data stored in the non-volatile memory of the first device.

In another aspect, any of the methods described above are performed by a storage device including (1) a plurality of non-volatile memory devices, (2) a storage controller having a processor, and (3) memory for storing one or more programs for execution by the processor, the one or more programs including instructions for performing any of the methods described above.

In yet another aspect, a non-transitory computer readable storage medium stores one or more programs for execution by one or more processors, the one or more programs including instructions for performing any of the methods described above.

Numerous details are described herein in order to provide a thorough understanding of the example implementations illustrated in the accompanying drawings. However, some embodiments may be practiced without many of the specific details, and the scope of the claims is only limited by those features and aspects specifically recited in the claims. Furthermore, well-known methods, components, and circuits have not been described in exhaustive detail so as not to unnecessarily obscure more pertinent aspects of the implementations described herein.

FIG. 1 is a block diagram illustrating data storage system 100, in accordance with some embodiments. While some example features are illustrated, various other features have not been illustrated for the sake of brevity and so as not to obscure pertinent aspects of the example embodiments disclosed herein. To that end, as a non-limiting example, data storage system 100 includes a storage device 120, which includes a storage controller 124 and a storage medium 130, and is used in conjunction with or includes a computer system 110. In some embodiments, storage medium 130 is a single flash memory device while in other embodiments storage medium 130 includes a plurality of flash memory devices. In some embodiments, storage medium 130 is NAND-type flash memory or NOR-type flash memory. In some embodiments, storage medium 130 includes one or more three-dimensional (3D) memory devices, as further defined herein. Further, in some embodiments storage controller 124 is a solid-state drive (SSD) controller. However, other types of storage media may be included in accordance with aspects of a wide variety of embodiments (e.g., PCRAM, ReRAM, STT-RAM, etc.). In some embodiments, a flash memory device includes one or more flash memory die, one or more flash memory packages, one or more flash memory channels or the like. In some embodiments, data storage system 100 can contain one or more storage device 120s.

Computer system 110 is coupled to storage controller 124 through data connections 101. However, in some embodiments computer system 110 includes storage controller 124, or a portion of storage controller 124, as a component and/or a subsystem. For example, in some embodiments, some or all of the functionality of storage controller 124 is implemented by software executed on computer system 110. Computer system 110 may be any suitable computer device, such as a computer, a laptop computer, a tablet device, a netbook, an internet kiosk, a personal digital assistant, a mobile phone, a smart phone, a gaming device, a computer server, or any other computing device. Computer system 110 is sometimes called a host, host system, client, or client system. In some embodiments, computer system 110 is a server system, such as a server system in a data center. In some embodiments, computer system 110 includes one or more processors, one or more types of memory, a display and/or other user interface components such as a keyboard, a touch screen display, a mouse, a track-pad, a digital camera and/or any number of supplemental devices to add functionality. In some embodiments, computer system 110 does not have a display and other user interface components.

Storage medium 130 is coupled to storage controller 124 through connections 103. Connections 103 are sometimes called data connections, but typically convey commands in addition to data, and optionally convey metadata, error correction information and/or other information in addition to data values to be stored in storage medium 130 and data values read from storage medium 130. In some embodiments, however, storage controller 124 and storage medium 130 are included in the same device (i.e., an integral device) as components thereof. Furthermore, in some embodiments, storage controller 124 and storage medium 130 are embedded in a host device (e.g., computer system 110), such as a mobile device, tablet, other computer or computer controlled device, and the methods described herein are performed, at least in part, by the embedded storage controller. Storage medium 130 may include any number (i.e., one or more) of memory devices including, without limitation, non-volatile semiconductor memory devices, such as flash memory device(s). For example, flash memory device(s) can be configured for enterprise storage suitable for applications such as cloud computing, for database applications, primary and/or secondary storage, or for caching data stored (or to be stored) in secondary storage, such as hard disk drives. Additionally and/or alternatively, flash memory device(s) can also be configured for relatively smaller-scale applications such as personal flash drives or hard-disk replacements for personal, laptop, and tablet computers. In some embodiments, storage medium 130 includes one or more three-dimensional (3D) memory devices, as further defined herein.

Storage medium 130 is divided into a number of addressable and individually selectable blocks, such as selectable portion 131. In some embodiments, the individually selectable blocks are the minimum size erasable units in a flash memory device. In other words, each block contains the minimum number of memory cells that can be erased simultaneously. Each block is usually further divided into a plurality of pages and/or word lines, where each page or word line is typically an instance of the smallest individually accessible (readable) portion in a block. In some embodiments (e.g., using some types of flash memory), the smallest individually accessible unit of a data set, however, is a sector, which is a subunit of a page. That is, a block includes a plurality of pages, each page contains a plurality of sectors, and each sector is the minimum unit of data for reading data from the flash memory device.

As noted above, while data storage densities of non-volatile semiconductor memory devices are generally increasing, a drawback of increasing storage density is that the stored data is more prone to being stored and/or read erroneously. In some embodiments, error control coding can be utilized to limit the number of uncorrectable errors that are introduced by electrical fluctuations, defects in the storage medium, operating conditions, device history, write-read circuitry, etc., or a combination of these and various other factors.

In some embodiments, storage controller 124 includes a management module 121-1, a host interface 129, a storage medium I/O interface 128, and additional module(s) 125. Storage controller 124 may include various additional features that have not been illustrated for the sake of brevity and so as not to obscure pertinent features of the example embodiments disclosed herein, and a different arrangement of features may be possible. Host interface 129 provides an interface to computer system 110 through data connections 101. Similarly, storage medium I/O 128 provides an interface to storage medium 130 though connections 103. In some embodiments, storage medium I/O 128 includes read and write circuitry, including circuitry capable of providing reading signals to storage medium 130 (e.g., reading threshold voltages for NAND-type flash memory).

In some embodiments, management module 121-1 includes one or more processing units (CPUs, also sometimes called processors) 122 configured to execute instructions in one or more programs (e.g., in management module 121-1). In some embodiments, the one or more CPUs 122 are shared by one or more components within, and in some cases, beyond the function of storage controller 124. Management module 121-1 is coupled to host interface 129, additional module(s) 125 and storage medium I/O 128 in order to coordinate the operation of these components. In some embodiments, one or more modules of management module 121-1 are implemented in management module 121-2 of computer system 110. In some embodiments, one or more processors of computer system 110 (not shown) are configured to execute instructions in one or more programs (e.g., in management module 121-2). Management module 121-2 is coupled to storage device 120 in order to manage the operation of storage device 120.

Additional module(s) 125 are coupled to storage medium I/O 128, host interface 129, and management module 121-1. As an example, additional module(s) 125 may include an error control module to limit the number of uncorrectable errors inadvertently introduced into data during writes to memory or reads from memory. In some embodiments, additional module(s) 125 are executed in software by the one or more CPUs 122 of management module 121-1, and, in other embodiments, additional module(s) 125 are implemented in whole or in part using special purpose circuitry (e.g., to perform encoding and decoding functions). In some embodiments, additional module(s) 125 are implemented in whole or in part by software executed on computer system 110.

In some embodiments, an error control module, included in additional module(s) 125, includes an encoder and a decoder. In some embodiments, the encoder encodes data by applying an error control code to produce a codeword, which is subsequently stored in storage medium 130. When the encoded data (e.g., one or more codewords) is read from storage medium 130, the decoder applies a decoding process to the encoded data to recover the data, and to correct errors in the recovered data within the error correcting capability of the error control code. Those skilled in the art will appreciate that various error control codes have different error detection and correction capacities, and that particular codes are selected for various applications for reasons beyond the scope of this disclosure. As such, an exhaustive review of the various types of error control codes is not provided herein. Moreover, those skilled in the art will appreciate that each type or family of error control codes may have encoding and decoding algorithms that are particular to the type or family of error control codes. On the other hand, some algorithms may be utilized at least to some extent in the decoding of a number of different types or families of error control codes. As such, for the sake of brevity, an exhaustive description of the various types of encoding and decoding algorithms generally available and known to those skilled in the art is not provided herein.

In some embodiments, storage device 120 receives a set of command instructions (e.g., from a host, such as computer system 110) for executing one or more commands (e.g., data operations) with respect to a storage medium (e.g., storage medium 130) of the storage device. As described in greater detail with respect to FIGS. 3A-3C, command instructions include memory operation commands (e.g., write, erase, and read operation commands) and status polling commands (e.g., to determine a status of device with respect to an executed memory operation). In some embodiments, one or more components of the storage device (e.g., management module 121-1, host interface 129, additional module(s) 125, and/or storage medium I/O 128) coordinate execution of the received set of command instructions.

In some embodiments, during or in conjunction with a write operation, host interface 129 receives data to be stored in storage medium 130 from computer system 110. The data received by host interface 129 is made available to an encoder (e.g., in additional module(s) 125), which encodes the data to produce one or more codewords. The one or more codewords are made available to storage medium I/O 128, which transfers the one or more codewords to storage medium 130 in a manner dependent on the type of storage medium being utilized.

In some embodiments, during or in conjunction with an erase operation, management module 121-1 (or a component of storage controller 124) obtains or determines physical addresses of data in storage medium 130 (e.g., using translation table 212-1, FIG. 2A) that is to be erased, and coordinates with storage medium I/O 128 to erase the data from storage medium 130.

In some embodiments, a read operation is initiated when a host (e.g., computer system 110) sends one or more host read commands (e.g., via data connections 101, or alternatively a separate control line or bus) to storage controller 124 requesting data from storage medium 130. Storage controller 124 sends one or more read access commands to storage medium 130, via storage medium I/O 128, to obtain raw read data in accordance with memory locations (addresses) specified by the one or more host read commands. Storage medium I/O 128 provides the raw read data (e.g., comprising one or more codewords) to a decoder (e.g., in additional module(s) 125). If the decoding is successful, the decoded data is provided to host interface 129, where the decoded data is made available to computer system 110. In some embodiments, if the decoding is not successful, storage controller 124 may resort to a number of remedial actions or provide an indication of an irresolvable error condition.

In some embodiments, status polling commands are sent when a host (e.g., computer system 110) and/or a storage device (e.g., storage controller 124 of storage device 120) seeks to determine a status of the storage device with respect to an issued memory operation command. Storage controller 124 (or a component thereof, such as management module 121-1) instructs storage medium I/O 128 to determine the status of an issued memory operation command (e.g., write command) that is executed with respect to storage medium 130. In some embodiments, responses to status polling commands are received by the storage controller 124 through storage medium I/O 128. In some embodiments, storage controller 124 and/or computer system 110 (or components thereof, such as management modules 121-1 and/or 121-2) process the received responses (e.g., which include status information, such as an operation completion status and/or a failure status, as discussed in greater detail with respect to FIGS. 3A-3C) with respect to predefined completion criteria. After the received responses have been processed, the storage device performs actions accordingly (e.g., forego sending subsequent command instructions, perform a remedial action, etc.), coordinating with one or more components of the data storage system (e.g., management module 121-1 and/or management module 121-2).

As explained above, a storage medium (e.g., storage medium 130) is divided into a number of addressable and individually selectable blocks and each block is optionally (but typically) further divided into a plurality of pages and/or word lines and/or sectors. While erasure of a storage medium is performed on a block basis, in many embodiments, reading and programming of the storage medium is performed on a smaller subunit of a block (e.g., on a page basis, word line basis, or sector basis). In some embodiments, the smaller subunit of a block consists of multiple memory cells (e.g., single-level cells or multi-level cells). In some embodiments, programming is performed on an entire page. In some embodiments, a multi-level cell (MLC) NAND flash typically has four possible states per cell, yielding two bits of information per cell. Further, in some embodiments, a MLC NAND has two page types: (1) a lower page (sometimes called a fast page), and (2) an upper page (sometimes called a slow page). In some embodiments, a triple-level cell (TLC) NAND flash has eight possible states per cell, yielding three bits of information per cell. Although the description herein uses TLC, MLC, and SLC as examples, those skilled in the art will appreciate that the embodiments described herein may be extended to memory cells that have more than eight possible states per cell, yielding more than three bits of information per cell. The encoding format of the storage media (i.e., TLC, MLC, or SLC and/or a chose data redundancy mechanism) is a choice made when data is actually written to the storage media.

If data is written to a storage medium in pages, but the storage medium is erased in blocks, pages in the storage medium may contain invalid (e.g., stale) data, but those pages cannot be overwritten until the whole block containing those pages is erased. In order to write to the pages with invalid data, the pages (if any) with valid data in that block are read and re-written to a new block and the old block is erased (or put on a queue for erasing). This process is called garbage collection. After garbage collection, the new block contains the pages with valid data and may have free pages that are available for new data to be written, and the old block can be erased so as to be available for new data to be written.

Figure 2A:
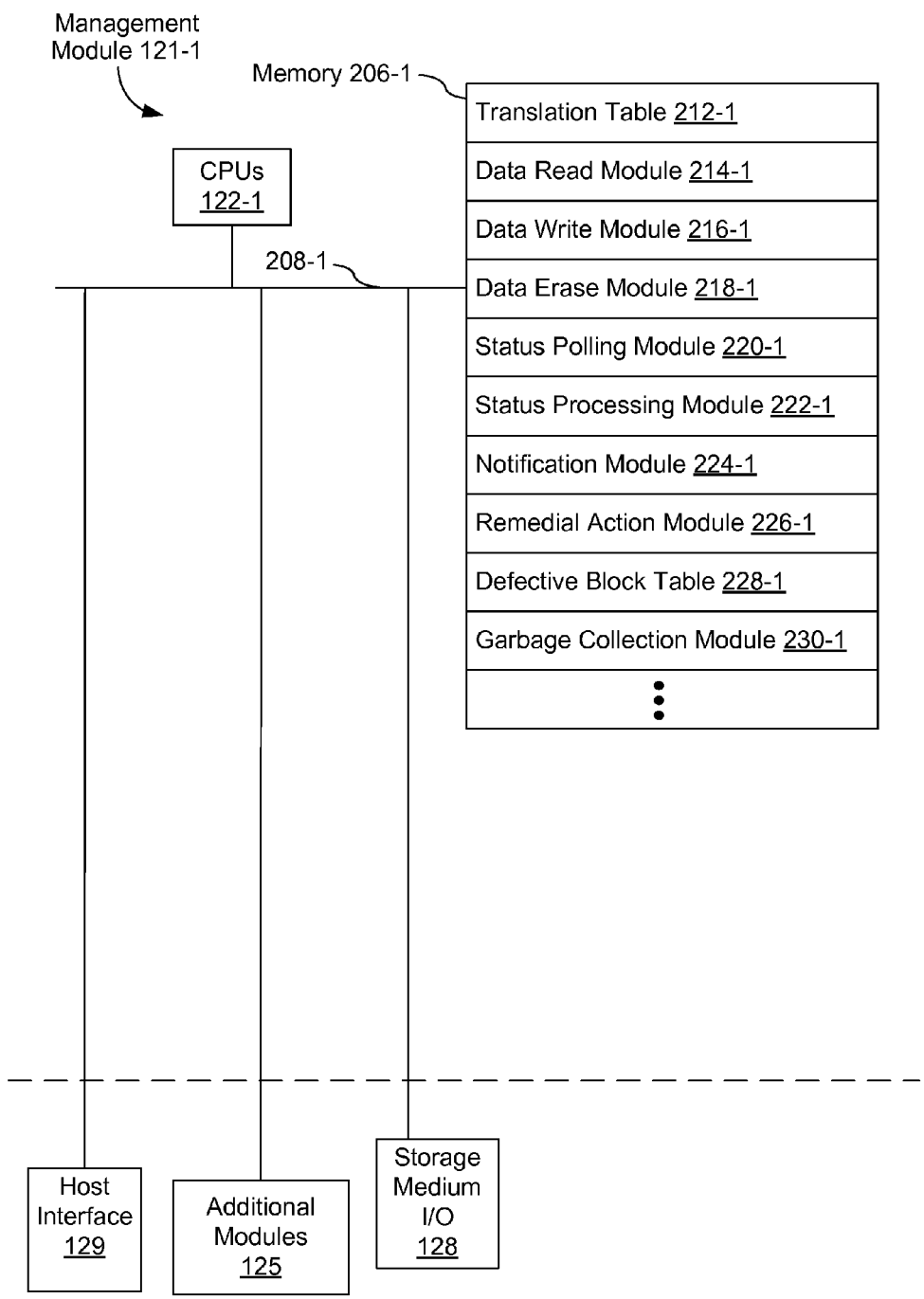
FIGS. 2A and 2B are block diagrams illustrating implementations of a management module, in accordance with some embodiments.

FIG. 2A is a block diagram illustrating a management module 121-1, in accordance with some embodiments, as shown in FIG. 1. Management module 121-1 typically includes one or more processing units (sometimes called CPUs or processors) 122-1 for executing modules, programs and/or instructions stored in memory 206-1 and thereby performing processing operations, memory 206-1 (sometimes called controller memory), and one or more communication buses 208-1 for interconnecting these components. The one or more communication buses 208-1 optionally include circuitry (sometimes called a chipset) that interconnects and controls communications between system components. Management module 121-1 is coupled to host interface 129, additional module(s) 125, and storage medium I/O 128 by the one or more communication buses 208-1. Memory 206-1 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 206-1 optionally includes one or more storage devices remotely located from the CPU(s) 122-1. Memory 206-1, or alternatively the non-volatile memory device(s)

within memory 206-1, comprises a non-transitory computer readable storage medium. In some embodiments, memory 206-1, or the non-transitory computer readable storage medium of memory 206-1 stores the following programs, modules, and data structures, or a subset or superset thereof:

translation table 212-1 that is used for mapping logical addresses to physical addresses (e.g., in some embodiments, translation table 212-1 includes mapping table 402, FIG. 4);

data read module 214-1 that is used for reading data from one or more codewords, pages or blocks in a storage medium (e.g., storage medium 130, FIG. 1);

data write module 216-1 that is used for writing data to one or more codewords, pages or blocks in a storage medium (e.g., storage medium 130, FIG. 1);

data erase module 218-1 that is used for erasing data from one or more blocks in a storage medium (e.g., storage medium 130, FIG. 1);

status polling module 220-1 that is used for sending status polling commands (e.g., to storage medium 130, FIG. 1);

status processing module 222-1 that is used for processing and determining whether responses to status polling commands (e.g., an operation completion status) meet predefined completion criteria;

notification module 224-1 that is used for notifying a host of whether responses to status polling commands meet predefined completion criteria;

remedial action module 226-1 that is used for performing a remedial action (e.g., marking block as unusable);

defective block table 228-1 that is used for maintaining a list of one or more blocks in a storage medium (e.g., storage medium 130, FIG. 1) that have been flagged as defective and/or flagged for remedial action; and garbage collection module 230-1 that is used for garbage collection for one or more blocks in a storage medium (e.g., storage medium 130, FIG. 1).

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 206-1 may store a subset of the modules and data structures identified above. Furthermore, memory 206-1 may store additional modules and data structures not described above. In some embodiments, the programs, modules, and data structures stored in memory 206-1, or the non-transitory computer readable storage medium of memory 206-1, provide instructions for implementing some of the methods described below. In some embodiments, some or all of these modules may be implemented with specialized hardware circuits that subsume part or all of the module functionality.

Although FIG. 2A shows management module 121-1 in accordance with some embodiments, FIG. 2A is intended more as a functional description of the various features which may be present in management module 121-1 than as a structural schematic of the embodiments described herein. In practice, and as recognized by those of ordinary skill in the art, the programs, modules, and data structures shown separately could be combined and some programs, modules, and data structures could be separated.

Figure 2B:
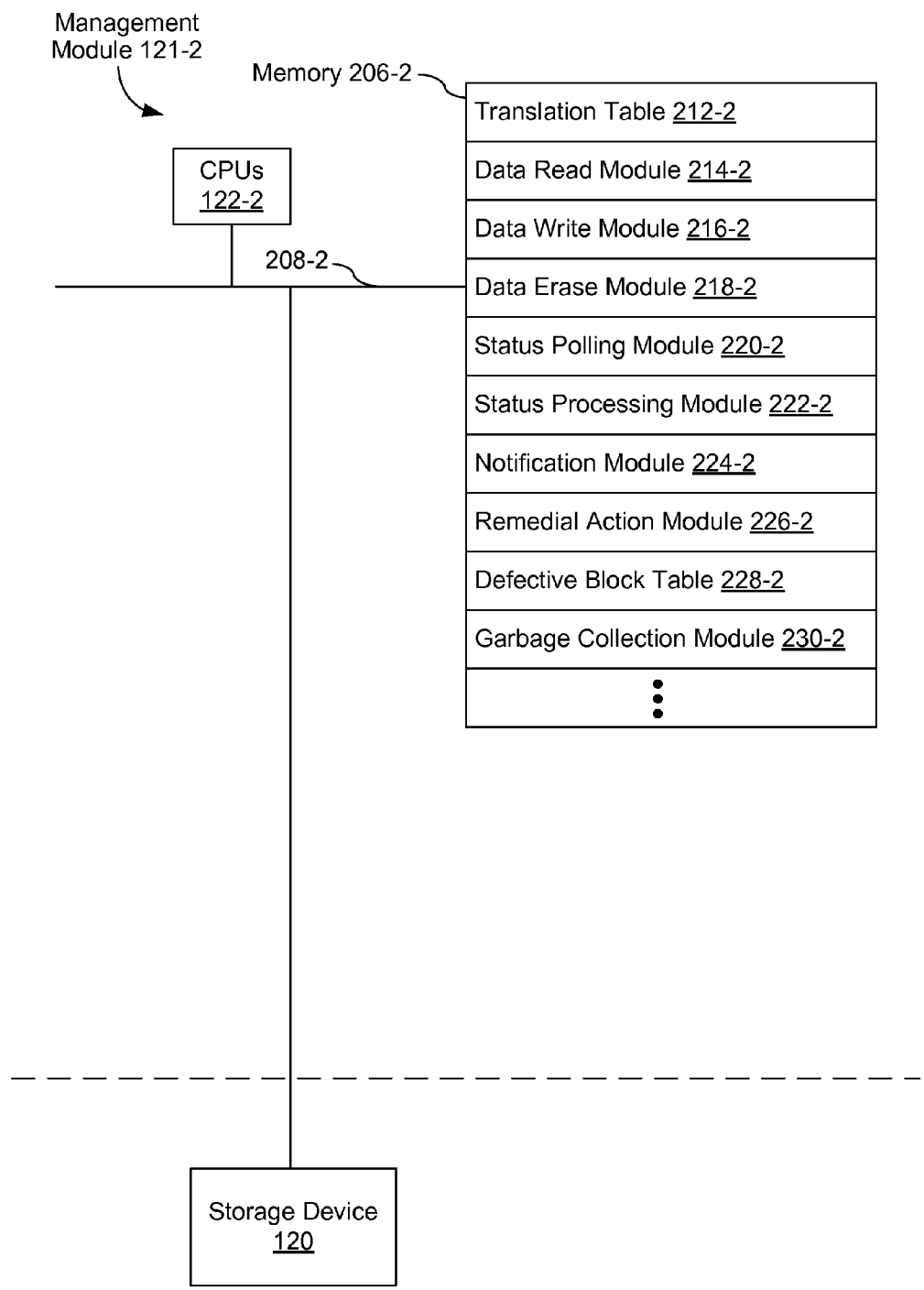

FIG. 2B is a block diagram illustrating a management module 121-2, in accordance with some embodiments. Management module 121-2 typically includes one or more processing units (sometimes called CPUs or processors) 122-2 for executing modules, programs and/or instructions stored in memory 206-2 and thereby performing processing operations, memory 206-2, and one or more communication buses 208-2 for interconnecting these components. In some embodiments, the one or more processors 122-2 are used to execute programs or modules beyond those of management module 121-2. The one or more communication buses 208-2 optionally include circuitry (sometimes called a chipset) that interconnects and controls communications between system components. Management module 121-2 is coupled to storage device 120 by the one or more communication buses 208-2. Memory 206-2 (sometimes called host memory) includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 206-2 optionally includes one or more storage devices remotely located from the CPU(s) 122-2. Memory 206-2, or alternatively the non-volatile memory device(s) within memory 206-2, comprises a non-transitory computer readable storage medium. In some embodiments, memory 206-2, or the non-transitory computer readable storage medium of memory 206-2 stores the following programs, modules, and data structures, or a subset or superset thereof:

translation table 212-2 that is used for mapping logical addresses to physical addresses (e.g., in some embodiments, translation table 212-1 includes mapping table 402, FIG. 4);

data read module 214-2 that is used for reading data from one or more codewords, pages or blocks in a storage medium (e.g., storage medium 130, FIG. 1);

data write module 216-2 that is used for writing data to one or more codewords, pages or blocks in a storage medium (e.g., storage medium 130, FIG. 1);

data erase module 218-2 that is used for erasing data from one or more blocks in a storage medium (e.g., storage medium 130, FIG. 1);

status polling module 220-2 that is used for sending status polling commands (e.g., to storage medium 130, FIG. 1);

status processing module 222-2 that is used for determining whether responses to status polling commands (e.g., an operation completion status) meet predefined completion criteria;

notification module 224-2 that is used for notifying a host (or one or more entities or processes within a host) of whether responses to status polling commands meet predefined completion criteria;

remedial action module 226-2 that is used for performing a remedial action (e.g., marking block as unusable);

defective block table 228-2 that is used for maintaining a list of one or more blocks in a storage medium (e.g., storage medium 130, FIG. 1) that have been flagged for a remedial action; and garbage collection module 230-2 that is used for garbage collection for one or more blocks in a storage medium (e.g., storage medium 130, FIG. 1).

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 206-2 may store a subset of the modules and data structures identified above. Furthermore, memory 206-2 may store additional modules and data structures not described above. In some embodiments, the programs, modules, and data structures stored in memory 206-2, or the non-transitory computer readable storage medium of memory 206-2, provide instructions for implementing some of the methods described below. In some embodiments, some or all of these modules may be implemented with specialized hardware circuits that subsume part or all of the module functionality.

Although FIG. 2B shows management module 121-2 in accordance with some embodiments, FIG. 2B is intended more as a functional description of the various features which may be present in management module 121-2 than as a structural schematic of the embodiments described herein. In practice, and as recognized by those of ordinary skill in the art, the programs, modules, and data structures shown separately could be combined and some programs, modules, and data structures could be separated.

Figure 3A:
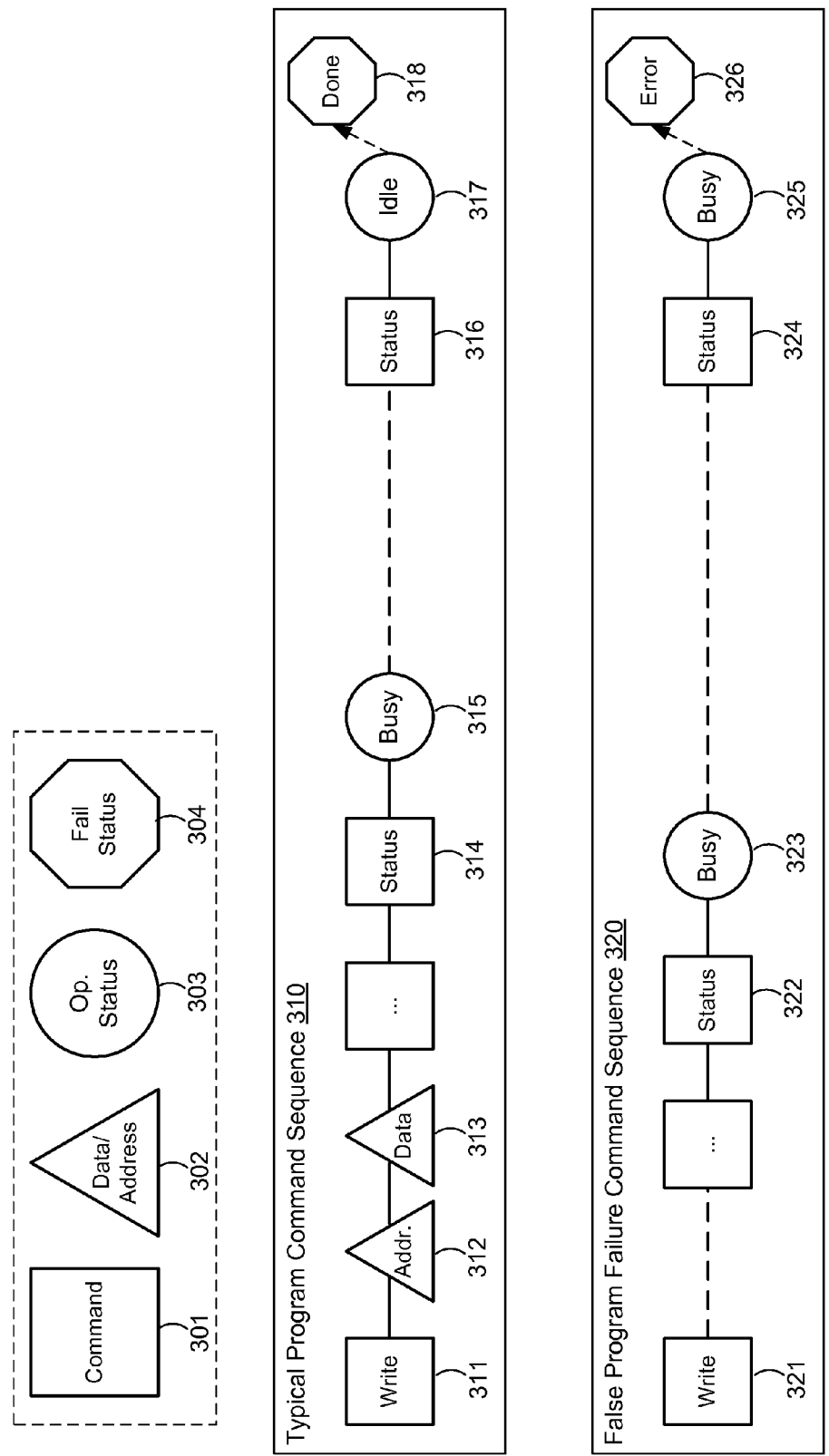
FIGS. 3A-3C illustrate exemplary command sequences in a storage device, in accordance with some embodiments.
Figure 3B:
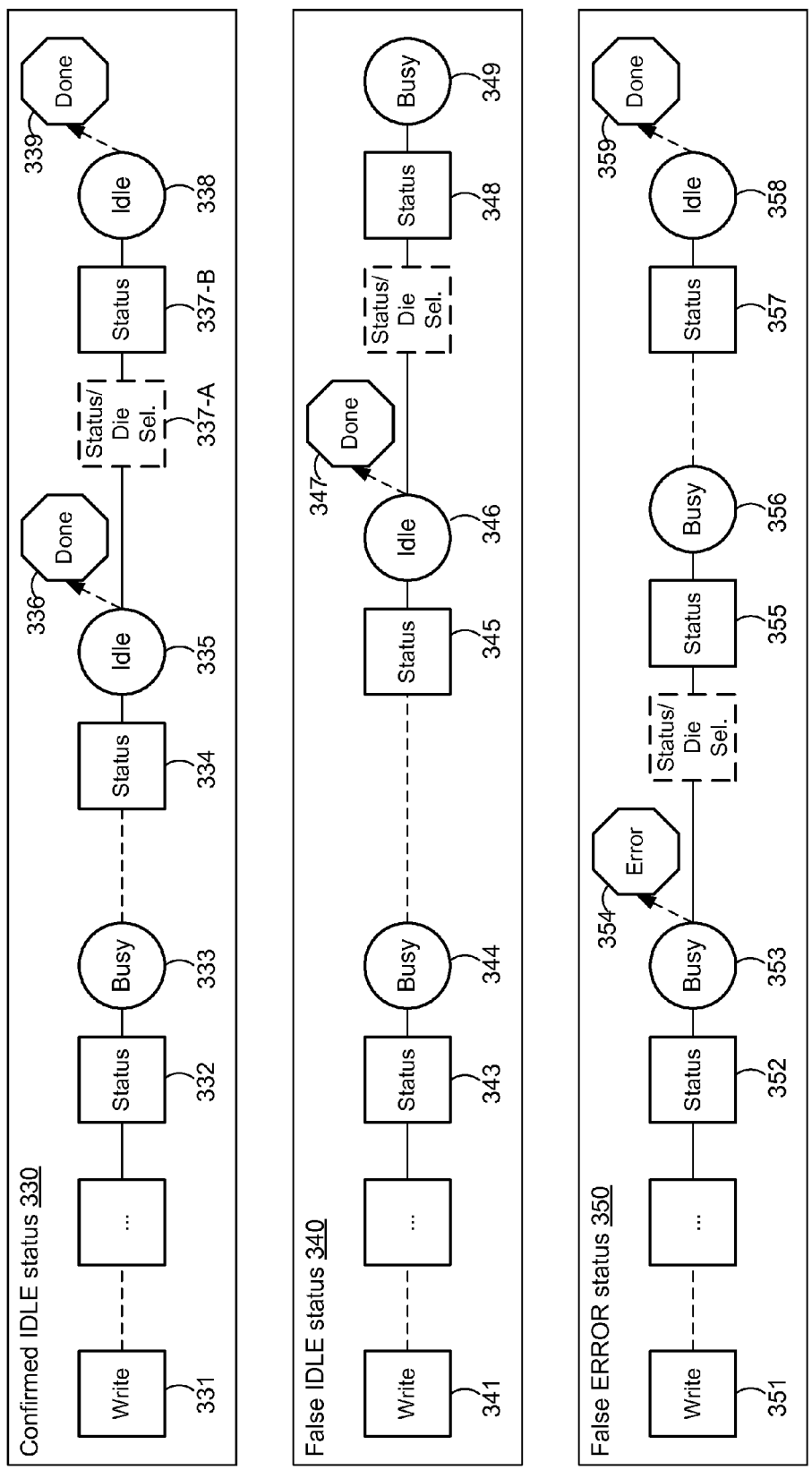
Figure 3C:
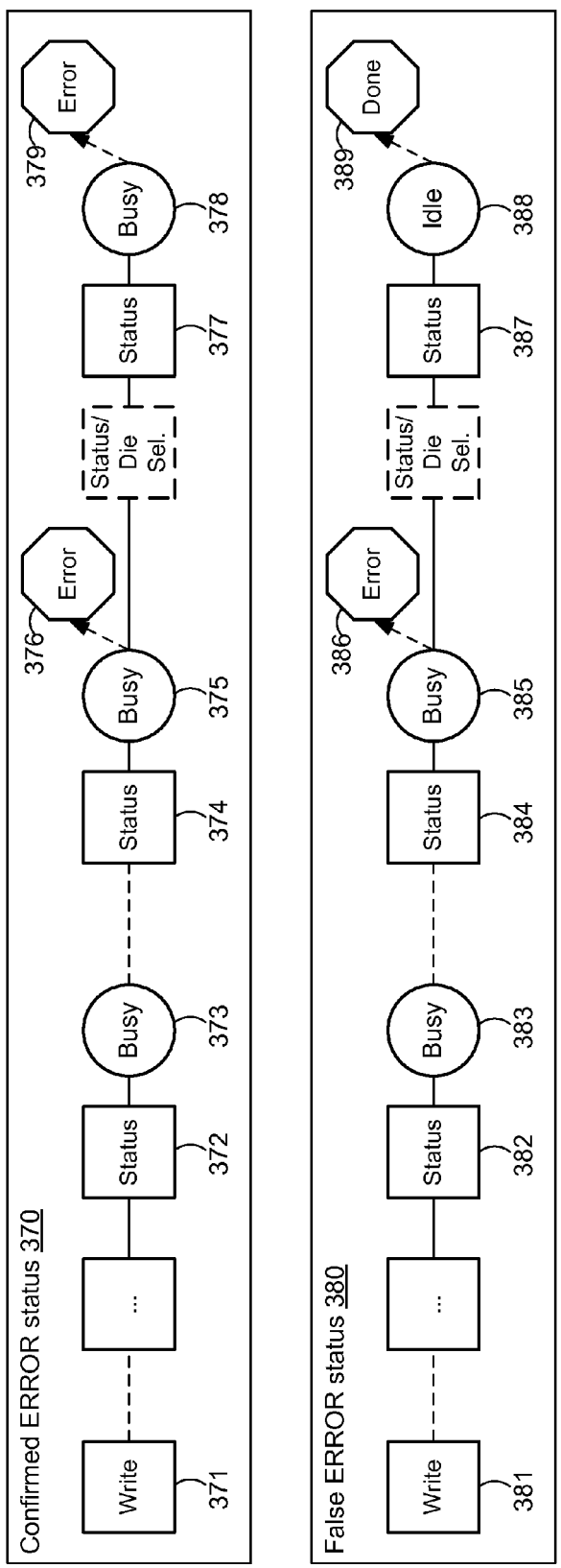
Figure 4A:
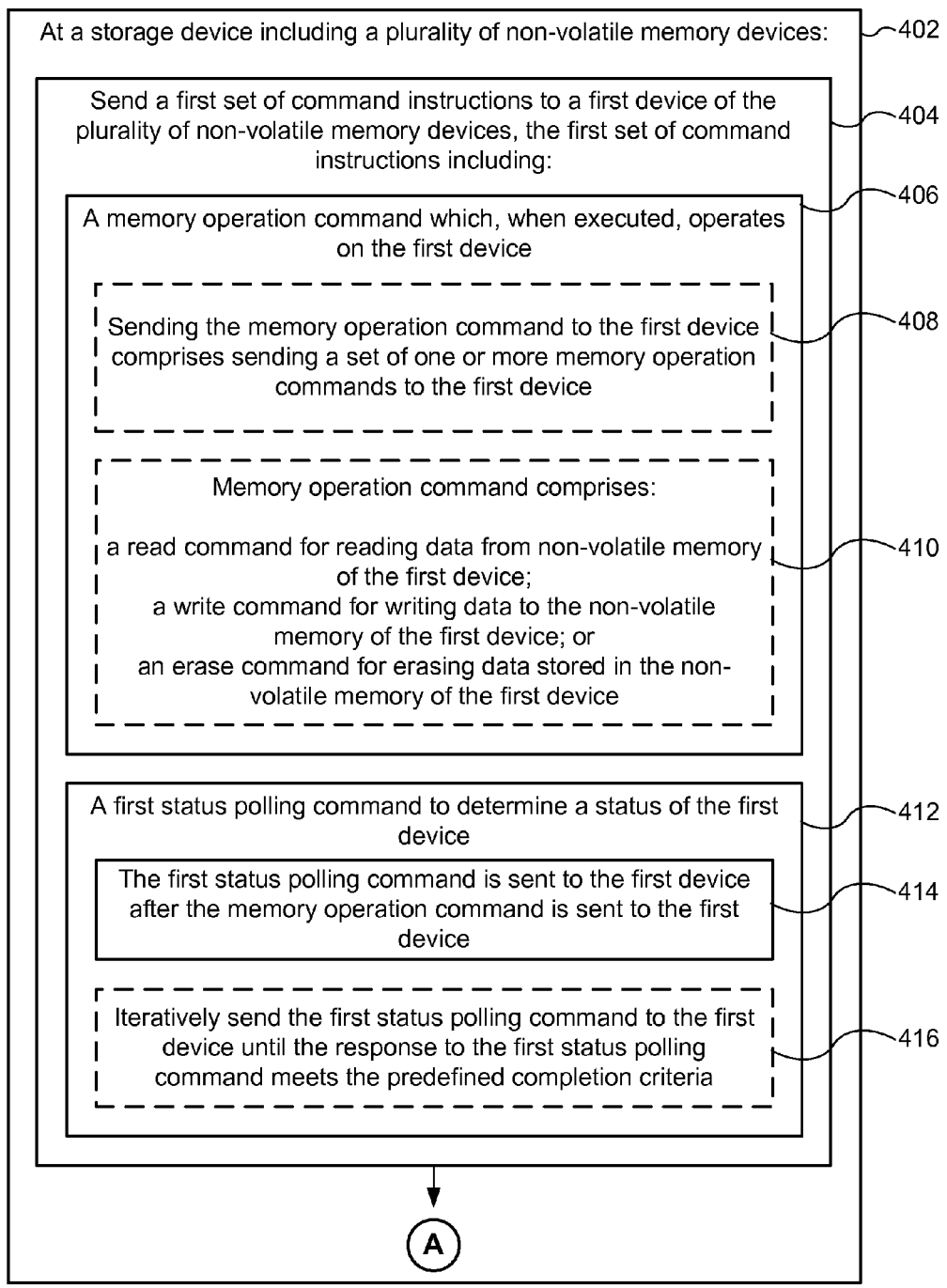
FIGS. 4A-4D illustrate a flowchart representation of a method of validating the status of memory operations at a storage device, in accordance with some embodiments.
Figure 4B:
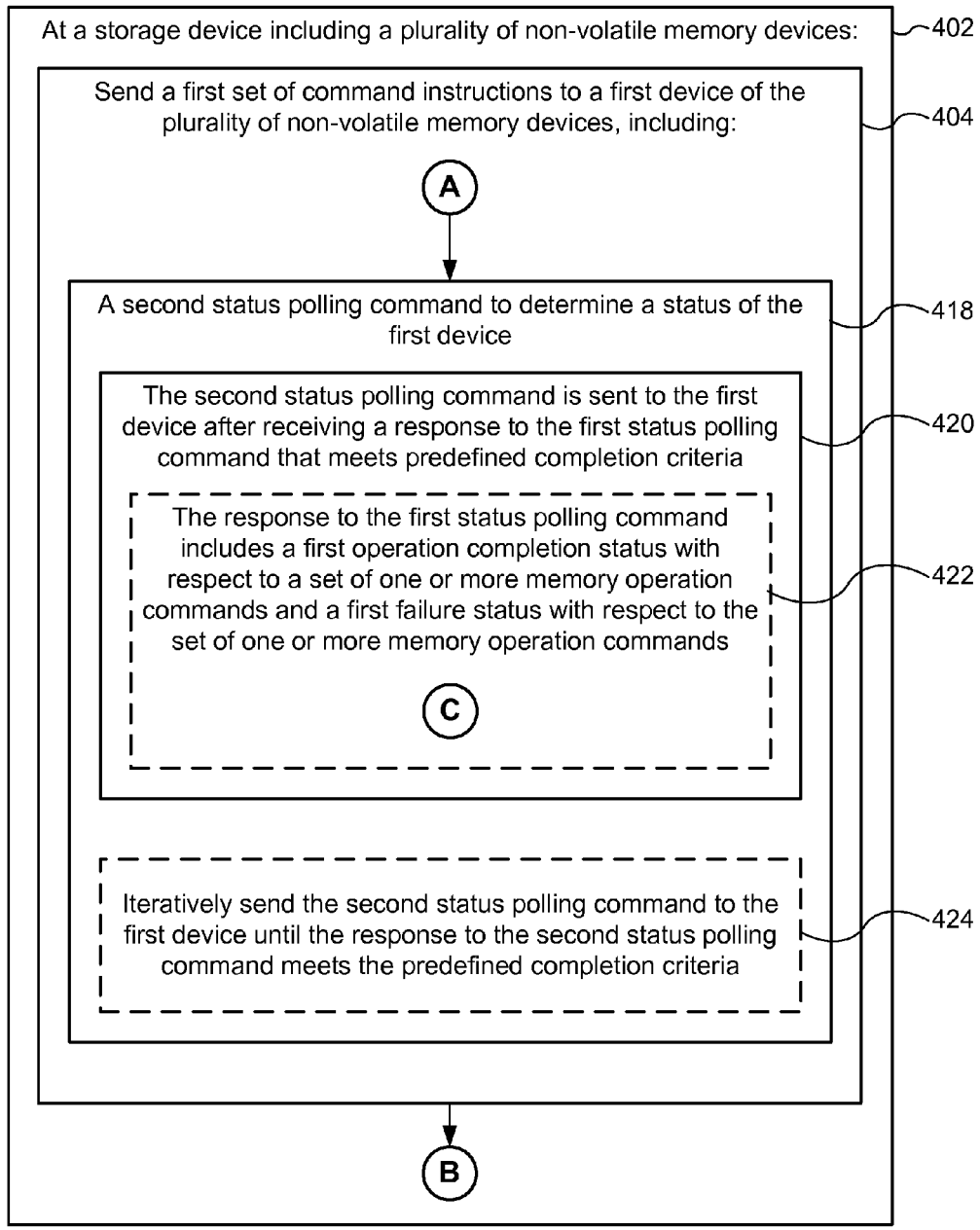
Figure 4C:
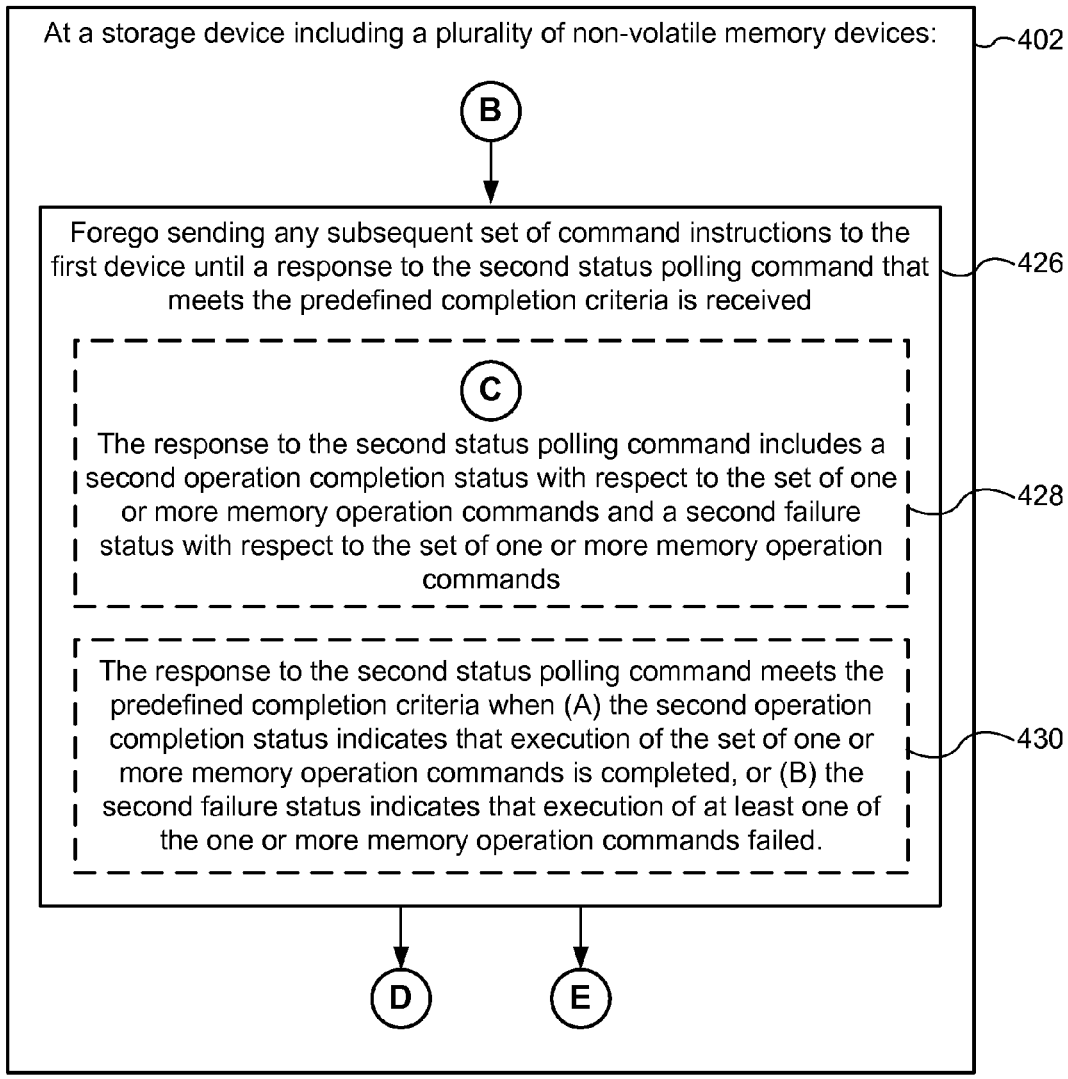
Figure 4D:
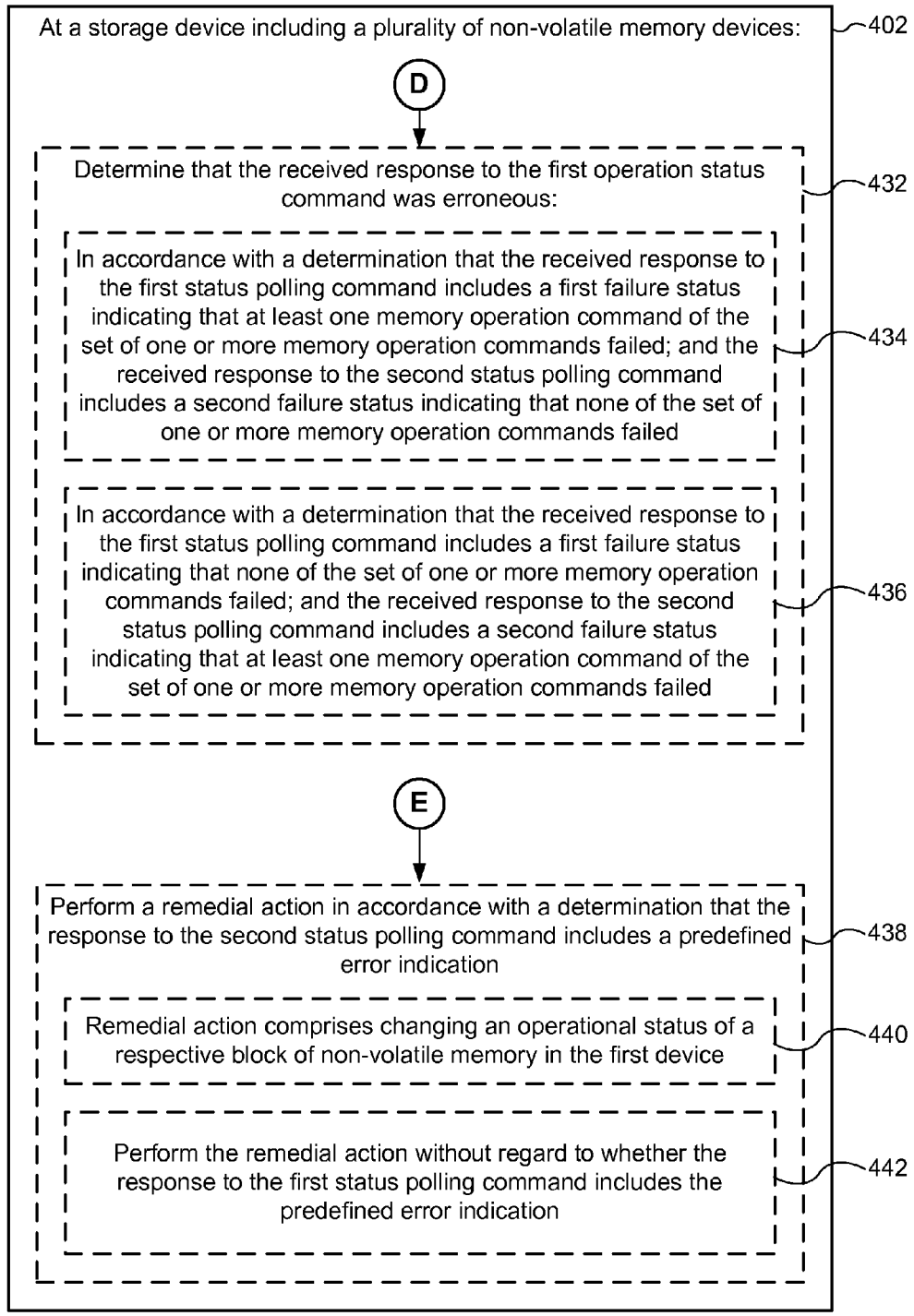

FIGS. 3A-3C illustrate exemplary command sequences in a storage device, in accordance with some embodiments.

In particular, FIGS. 3A-3C are block diagrams illustrating examples of command instructions sent to and executed by a storage device (e.g., storage device 120), and the status information that is received. Some of the examples below illustrate the use of one or more additional status polling commands and predefined completion criteria to validate the status of a device with respect to a set of executed memory operation commands, and thus identify erroneous status information.

The block diagrams of FIGS. 3A-3C incorporate various symbols for representing the types of commands and information involved, such as a command instruction (e.g., 301), data and/or a physical or logical address in memory (e.g., address of a target block in storage medium 130) to which the data is written, or from which the data is read or erased (e.g., 302), an operation completion status (e.g., 303), and a failure status (e.g., 304). In some embodiments, command instructions, data, addresses, and status information correspond to and are sent as one or more bits or bytes.

As described herein, command instructions (e.g., command 301) are commands sent to a storage device (e.g., storage device 120, or a component thereof, such as storage controller 124) for execution, where such commands corresponds to one or more actions or data operations to be performed with respect to a storage medium of the storage device (e.g., a target block comprising storage medium 130). A set of command instructions are sometimes referred to as "descriptors," where in some embodiments, one or more descriptors are sent together to perform a particular operation. Commands include: (i) memory operation commands, and (ii) status polling commands.

Memory operation commands include, for example, read commands for reading data from non-volatile memory (e.g., storage medium 130), write commands for writing data to non-volatile memory, and erase commands for erasing data stored in non-volatile memory.

Status polling commands (e.g., status polling command 314) are issued (e.g., by management module 121-1, to storage medium 130) to determine the status of a storage device with respect to an issued memory operation command. In some embodiments, responses to status polling commands include (i) an operation completion status and/or (ii) a failure status.

An operation completion status (e.g., "BUSY" operation completion status 315) indicates whether one or more memory operation commands in a set of command instructions have completed. In some embodiments, a operation completion status indicates that execution of a respective memory operation command has been completed (e.g., data has finished writing to a target block of storage medium 130, represented by "IDLE" operation completion status 317 in FIG. 3A), or has not been completed and/or is still in progress (e.g., data is still being writing to a target block of storage medium 130, represented by "BUSY" status 315 in FIG. 3A). In some implementations, an operation completion status causes a storage device (e.g., a component of storage device 120, such as storage controller 124) to either issue, or forego issuing, subsequent commands (e.g., memory operation commands and/or status polling commands). For example, if a "BUSY" operation completion status (e.g., 315) is received as a response to an issued status polling command (e.g., 316), storage controller 124 will forego sending subsequent memory operation commands, and, in some implementations, will continue to issue additional status polling commands until an "IDLE" operation completion status is received. In another example, when an "IDLE" operation completion status (e.g., 317) is received in response to an issued status polling command, storage controller 124 begins sending subsequent memory operation commands. In some embodiments, operation completion statuses are produced by circuitry implemented in a storage medium of a storage device (e.g., storage medium 130), and are sent by the storage medium (or a component thereof, such as a flash controller of storage medium 130, not shown in FIG. 1) to a component of the storage device (e.g., storage controller 124) and/or a host (e.g., computer system 110) for processing.

A failure status (e.g., "ERROR" failure status 326) indicates whether one or more of the memory operation commands have completed with or without error. In some embodiments, a failure status indicates that that execution of a respective memory operation command has failed (e.g., "ERROR" failure status 326 indicates that one or more errors has been detected in data written to a target block of storage medium 130), or has not failed (e.g., "DONE" failure status 318 indicates that no errors have been detected in data written to a target block of storage medium 130). In some embodiments, a failure status is produced by error detection circuitry implemented in a storage medium of a storage device (e.g., circuitry in storage medium 130 not shown) and/or a storage controller (e.g., storage controller 124 of storage device 120). In other embodiments, a failure status is produced in accordance with and corresponds to an operation completion status, where both are received in response to the same status polling command. For example, a "DONE" failure status (e.g., 318) is produced and sent in accordance with a received "IDLE" operation completion status (e.g., 317). Similar to operation completion statuses, in some embodiments, a failure status causes a storage device to either issue, or forego issuing, subsequent commands (e.g., a "DONE" failure status causes storage controller 124 to issue a new set of memory operation commands). Furthermore, in some embodiments, a failure status causes a storage device (e.g., a component of storage device 120, such as storage controller 124) to perform, or presents a host (e.g., computer system 110) with the option to perform, a remedial action (e.g., marking a target block as unusable). Remedial actions are discussed in greater detail with respect to FIGS. 4A-4C.

Erroneous responses to status polling commands, such as an erroneous operation completion status and/or an erroneous failure status can disrupt the operation of a storage device. Erroneous status information is sometimes a consequence of hardware designs that cause intermittent problems in latching reported status information, for example due to problems with timing margin or transient noise, either of which can cause reported status information to become corrupted or read incorrectly. In some cases, for example, an erroneous operation completion status results in incorrect data being returned to the host and/or loss of host data if memory operation commands are issued before previous memory operation commands are completed. For example, if an "IDLE" operation completion status is received in response to a status polling command, when in fact the storage device has not completed the corresponding memory operation command (i.e., a write command is in progress, and therefore a "BUSY" status should be returned), a storage device will incorrectly assume that it can issue subsequent memory operation commands, where doing so puts host data at risk. Command sequence 310 of FIG. 3A illustrates an example in which erroneous status information can be present. As shown, command sequence 310 includes a "write" memory operation command 311, sent with associated data 312 and memory address 313 to which the data is written. After sending "write" memory operation command 311, status polling command 314 is issued to determine the status of the write command. In response, a "BUSY" operation completion status 315 is received, indicating that the write command is in progress and has not yet been completed. Subsequent to receiving the "BUSY" status, status polling command 316 is issued to again determine the status of the write command. In the example shown, "IDLE" operation completion status 317 is received in addition to "DONE" failure status 318, indicating that the write command has completed without any errors detected. However, as explained above, operation completion statuses and/or failure statuses are in some cases erroneous, and therefore falsely indicate the status of a device with respect to an executed memory operation. Thus, in example command sequence 310, although "IDLE" operation completion status 317 and "DONE" failure status 318 indicate that "write" memory operation command 311 has completed without error, it may be that the data has not actually finished writing, or that an error has been detected in the written data. Consequently, subsequent command instructions for performing additional memory operations may be sent under the incorrect assumption that the previous set of command instructions were performed completely and without error, subjecting the device to the risk of corrupting or losing host data.

Erroneous failure statuses are potentially disruptive to the operation of a storage device. Particularly, an erroneous failure status can cause remedial actions to be performed when they are not needed. For example, if an "ERROR" failure status is received and execution of a memory operation command is still in progress, when in fact no error has been detected, the storage device may unnecessarily perform a remedial action, such as marking a target block as unusable. Consequently, the expected lifetime of the storage device is shortened and its performance degraded. Command sequence 320 illustrates an example in which an erroneous failure status is received. As shown, after "write" memory operation command 321 is sent, status polling command 322 is issued to determine the status of the write command. "BUSY" operation completion status 323 is received, during which time execution of the write command continues. Status polling command 324 is then later issued, to which another "BUSY" operation completion status (e.g., 325) is received. In this case, however, "ERROR" failure status 326 is received in response to status polling command 324, indicating that "BUSY" operation completion status 325 has been misinterpreted, and falsely indicating that an error has been detected in executing the write command. In some cases, an erroneous failure status such as "ERROR" failure status 326 causes the storage device to perform a remedial action on the target block (e.g., marking target block as unusable) when one is not needed.

As described below in greater detail below, to address the risk of erroneous status information, in some implementations, additional status polling commands and predefined completion criteria are used to validate the status of a device with respect to a set of executed commands, and further to identify erroneous status information. As a result, the storage device operates in accordance with the actual status of the storage device, thereby ensuring proper device operation, and improving device reliability, performance, and endurance.

Predefined completion criteria include conditions for sending additional status polling commands to validate received status information, and to identify erroneous status information. In some embodiments, predefined completion criteria are based on a received completion status and/or failure status which, if erroneous, would risk disrupting the proper operation of a storage device. For example, given the risks discussed above with regards to issuing subsequent memory operation commands while previous memory operations are still in progress, an additional status polling command can be issued to confirm that a device has in fact completed execution of a previously issued command. Thus, one or more additional status polling commands are issued, and therefore predefined completion criteria are satisfied, when an "IDLE" operation completion status is received in response to the additional status polling command (e.g., issuing additional status polling command 337-B, as shown in FIG. 3B, when "IDLE" operation completion status 335 is received). In another example, to prevent remedial actions from being performed when a failure status falsely indicates that an error has occurred, one or more additional status polling commands are issued, and predefined completion criteria are satisfied when an "ERROR" failure status is received in response to an earlier status polling command (e.g., issuing additional status polling command 355 when "ERROR" failure status 354 is received in response to an earlier status polling command). In summary, in some embodiments the predefined completion criteria is satisfied when, in response to a status polling command, either a "IDLE" operation completion status is received or an "ERROR" failure status is received.

In some embodiments, predefined completion criteria also include conditions for performing (or foregoing performance of) actions by a storage device. In some embodiments, the storage device sends (or foregoes sending) subsequent command instructions depending on whether a response to an additional status polling command meets predefined completion criteria. In such embodiments, predefined completion criteria are based on an operation completion status received in response to the additional status polling command. For example, a "BUSY" operation completion status (e.g., 349) received in response to an additional status polling command causes the storage device to forego or delay sending subsequent command instructions, while an "IDLE" operation completion status (e.g., 338) causes the storage device to send subsequent command instructions. In some embodiments, predefined completion criteria are based on a failure status received in response to an additional status polling command, and the storage device performs a remedial action in accordance with the response to the additional status polling command meeting predefined completion criteria. For example, an "ERROR" failure status received in response to the additional status polling command causes the storage device to perform a remedial action, such as marking a target block as unusable.

In some embodiments, predefined completion criteria are based on a combination of an operation completion status and a failure status. Alternatively and/or additionally, completion criteria are based solely on either the operation completion status or the failure status. In other words, in some implementations, either the operation completion status or the failure status is ignored. For example, in some embodiments the predefined completion criteria are based solely on the operation completion status when the memory operation commands are all read commands. Nevertheless, in some embodiments, even when the memory operation commands set to a non-volatile memory device (e.g., flash memory die) are all read commands, the memory operation command is followed by both a first status polling command and a second status polling command to determine the status of the device from which data is read. For example, the second status polling command is sent only after an "IDLE" operation completion status is received in response to the first status polling command. And then the storage device waits until a response to the second status polling command satisfies the predefined completion criteria before issuing any subsequent memory operation command to the same device. This methodology avoids false determinations that a read operation is complete and concomitant errors that would result from such false determinations.

Command sequences 330 to 380 are examples illustrating the use of additional status polling commands and predefined completion criteria to verify the status of a device with respect to a set of command instructions. Certain features and symbols have not been illustrated in the following examples for the sake of brevity and so as not to obscure pertinent aspects of the examples disclosed herein.

Command sequence 330 of FIG. 3B illustrates an example in which an operation completion status is validated with an additional status polling command. As shown, at some point after "write" memory operation command 331 begins execution, status polling command 334 is issued to determine whether the write command has completed. In response, "IDLE" operation completion status 335 and "DONE" failure status 336 are received. As explained above, the "DONE" failure status 336 indicates that no error was detected. However, to avoid the risk that the operation completion status and failure status are erroneous (i.e., to avoid issuing subsequent memory operation commands while the storage device has not actually finished executing the previous write command), additional status polling command 337-B is issued (following optional status/die select command 337-A, described below with respect to FIGS. 4A-4D) to validate the status information received in response to status polling command 334. More specifically, in this example, because both "IDLE" operation completion status 335 and "DONE" failure status 336 are received, predefined completion criteria are met and additional status polling command 337-B is therefore issued. In response to additional status polling command 337-B, "IDLE" operation completion status 338 and "DONE" failure status 339 are received. In this example, the predefined completion criteria include an "IDLE" operation completion status received in response to an additional status polling command. Thus, the predefined completion criteria are satisfied in this example, and accordingly, the storage device validates the received status information (e.g., confirming "IDLE" operation completion status 335 indicating that the write command has in fact completed) and sends subsequent command instructions.

Command sequence 340 of FIG. 3B illustrates a similar example to command sequence 330, but in this example an erroneous operation completion status is identified with an additional status polling command. After "write" memory operation command 341 begins execution, status polling command 345 is issued to determine whether the write command has completed. In response, "IDLE" operation completion status 346 and "DONE" failure status 347 are received, and additional status polling command 348 is issued to validate the status information. In this example, a "BUSY" operation completion status 349 is received in response to the additional status polling command, and accordingly the storage device determines that the status information received in response to the previous status polling command (e.g., "IDLE" operation completion status 346 and "DONE" failure status 347) is erroneous, and that the write command has not completed execution. The storage device therefore foregoes sending any subsequent command instructions until a response to the additional status polling command that meets predefined completion criteria (e.g., an "IDLE" operation completion status and/or an "ERROR" failure status) is received.

Command sequence 350 of FIG. 3B illustrates an example in which an erroneous failure status is identified with an additional status polling command. After "write" memory operation command 351 begins execution, status polling command 352 is issued to determine whether the write command has completed. In response, "BUSY" operation completion status 353 and "ERROR" failure status 354 are received. To prevent the storage device from performing a remedial action in response to a potentially erroneous failure status (e.g., "ERROR" failure status 354), additional status polling command 355 is issued. Specifically, in this example, predefined completion criteria are met and additional status polling command 355 is issued because the "ERROR" failure status 354 is received. In response to additional status polling command 355, "BUSY" operation completion status 356 is received. In some embodiments, receipt of "BUSY" operation completion status 356 causes the storage device to determine that the failure status received in response to status polling command (e.g., "ERROR" failure status 354) is erroneous, and that the write command has not completed execution. The storage device therefore does not perform any remedial action, and foregoes sending any subsequent command instructions until it later receives the response to additional status polling command 357 that meets the predefined completion criteria (e.g., "IDLE" operation completion status and/or "ERROR" failure status). It is noted that status polling command 357 is typically a reissue of status polling command 355, since, in at least some embodiments, each status polling command is reissued until either an "IDLE" operation completion status or an "ERROR" failure status is received. In this example, predefined completion criteria are met with respect to additional status polling command 355/357 when "IDLE" operation completion status 358 and "DONE" failure status 359 are received.

Command sequence 370 of FIG. 3C illustrates an example in which an initially received failure status is validated with an additional status polling command. In response to issuing status polling command 374 to determine whether "write" memory operation command 371 has completed, "BUSY" operation completion status 375 and "ERROR" failure status 376 are received. To validate the received status information so that a remedial action is performed only if necessary (e.g., marking a defective target block as unusable), additional status polling command 377 is issued. In response, both "BUSY" operation completion status 378 and "ERROR" failure status 379 are received. In this example, the predefined completion criteria are satisfied by the "ERROR" operation completion status received in response to the additional status polling command, and as a result, the storage device validates the failure status and performs an appropriate remedial action.

Command sequence 380 of FIG. 3C illustrates another example in which an erroneous failure status is identified with an additional status polling command. In response to issuing status polling command 384 to determine whether "write" memory operation command 381 has completed, "BUSY" operation completion status 385 and "ERROR" failure status 386 are received. To validate the received status information so that a remedial action is not unnecessarily performed, additional status polling command 387 is issued. In response, both "IDLE" operation completion status 388 and "DONE" failure status 389 are received. The predefined completion criteria are satisfied by the "IDLE" operation completion status received in response to an additional status polling command. In response to the satisfaction of the predefined completion criteria in combination with receipt of "DONE" failure status 389, indicating that "write" memory operation command 381 completed without error, the storage device determines that "ERROR" failure status 386 received in response to status polling command 384 is erroneous and sends subsequent command instructions. In this example, the storage device forgoes performing a remedial action, since it has determined that "ERROR" failure status 386 received in response to status polling command 384 was erroneous.

FIGS. 4A-4D illustrate a flowchart representation of a method 400 of validating the status of memory operations at a storage device, in accordance with some embodiments. A storage device (e.g., storage device 120, FIG. 1) coordinates and manages multiple sub-system components to validate the status of memory operations at the storage device, which initiates performance of method 400. At least in some implementations, method 400 is performed by a host (e.g., computer system 110 of FIG. 1, or a component thereof, such as management module 121-2), a storage device (e.g., storage device 120), or one or more components of the storage device (e.g., storage controller 124, management module 121-1, and/or a component of storage medium 130). In some embodiments, method 400 is governed by instructions that are stored in a non-transitory computer readable storage medium and that are executed by one or more processors of a device, such as the one or more processors 122-1 of management module 121-1, as shown in FIGS. 1 and 2A, or alternatively, the one or more processors 122-2 of management module 121-2, as shown in FIGS. 1 and 2B. In some embodiments, method 400 is performed by or governed by one or more modules of a storage device controller of host, for example a status polling module 220-1 or 220-2, a status processing module 222-1 or 222-2, a remedial action module 226-1 or 226-2, and/or a notification module 224-1 or 224-2.

A storage device (e.g., storage device 120, FIG. 1) includes (402) a plurality of non-volatile memory devices (e.g., storage medium 130). The storage device sends (404) a first set of command instructions to a first device of the plurality of non-volatile memory devices, including: a memory operation command (406) which, when executed, operates on the first device; a first status polling command (412) to determine a status of the first device; and a second status polling command (418) to determine a status of the first device.

In some embodiments, sending the memory operation command to the first device comprises (408) sending a set of one or more memory operation commands to the first device. In some embodiments, a memory operation command comprises (410): a read command for reading data from non-volatile memory of the first device; a write command (e.g., "write" memory operation command 311, FIG. 3A) for writing data to the non-volatile memory of the first device; or an erase command for erasing data stored in the non-volatile memory of the first device.

The first status polling command is sent (414) to the first device after the memory operation command is sent to the first device. In some embodiments, the storage device iteratively sends (416) the first status polling command to the first device until the response to the first status polling command meets predefined completion criteria. For example, as shown in command sequence 330 of FIG. 3B, status polling command 332 is iteratively sent (represented by the dashed lines between status polling commands 332 and 334) until a response to a status polling command meets predefined completion criteria (e.g., "IDLE" operation completion status 338 and "DONE" failure status 339 are received in response to status polling command 337-B).

The second status polling command is sent (420) to the first device after receiving a response to the first status polling command (that meets the predefined completion criteria). In some embodiments, the response to the first status polling command includes (422) a first operation completion status with respect to a set of one or more memory operation commands and a first failure status with respect to the set of one or more memory operation commands. For example, referring to command sequence 330 of FIG. 3B, when a response to a first status polling command meets predefined completion criteria (e.g., "IDLE" operation completion status 335 and "DONE" failure status 336 are received in response to status polling command 334), a second status polling command (e.g., status polling command 337-B) is sent. Optionally, in some embodiments, an additional status polling command is issued together with an optional status/die select command (e.g., status/die select command 337-A, FIG. 3B). In some embodiments, the storage device iteratively sends (424) the second status polling command to the first device until the response to the second status polling command meets the predefined completion criteria. For example, as shown in command sequence 350 of FIG. 3B, additional status polling command 355 is iteratively sent (represented by the dashed lines between status polling commands 355 and 357) until a response to the additional status polling command meets predefined completion criteria (e.g., "IDLE" operation completion status 358 and "DONE" failure status 359 are received in response to additional status polling command 357). In some embodiments, the predefined completion criteria is satisfied when, in response to a status polling command, either a "IDLE" operation completion status is received or an "ERROR" failure status is received.

The storage device forgoes (426) sending any subsequent set of command instructions to the first device until a response to the second status polling command (that meets the predefined completion criteria) is received. In some embodiments, the response to the second status polling command includes (428) a second operation completion status with respect to the set of one or more memory operation commands and a second failure status with respect to the set of one or more memory operation commands. Furthermore, in some embodiments, the response to the second status polling command meets (430) the predefined completion criteria when (A) the second operation completion status indicates that execution of the set of one or more memory operation commands is completed (e.g., "IDLE" operation completion status 338 of command sequence 330, FIG. 3B), or (B) the second failure status indicates that execution of at least one of the one or more memory operation commands failed (e.g., "ERROR" failure status 379 of command sequence 370, FIG. 3C).

In some embodiments, the storage device determines (432) that the received response to the first operation status command was erroneous in accordance with a determination that (434): (1) the received response to the first status polling command includes a first failure status indicating that at least one memory operation command of the set of one or more memory operation commands failed; and (2) the received response to the second status polling command includes a second failure status indicating that none of the set of one or more memory operation commands failed. An example of such an embodiment is described with respect to command sequence 380 of FIG. 3C.

In some embodiments, the storage device determines (432) that the received response to the first operation status command was erroneous in accordance with a determination that (436): the received response to the first status polling command includes a first failure status indicating that none of the set of one or more memory operation commands failed; and the received response to the second status polling command includes a second failure status indicating that at least one memory operation command of the set of one or more memory operation commands failed.

In some embodiments, the storage device performs (438) a remedial action in accordance with a determination that the response to the second status polling command that meets the predefined completion criteria includes a predefined error indication. In some embodiments, a predefined error indication is a received failure status in response to a second status polling command (e.g., "ERROR" failure status 379 of command sequence 370, FIG. 3C). In some embodiments, the remedial action comprises (440) changing an operational status of a respective block (e.g., a target block of the memory operation command) of non-volatile memory in the first device. For example, changing an operational status includes marking a target block as a "bad" or unusable block, and adding it to a list of unusable blocks (e.g., defective block table 228-1, FIG. 2A). Alternatively, if the failure status indicates a failure of a write operation, such as an upper page write, changing an operational status includes marking the target block for garbage collection and optionally re-using the target block as an SLC block. In some embodiments, the storage device performs (442) the remedial action without regard to whether the response to the first status polling command that meets the predefined completion criteria includes the predefined error indication.

Operation completion statuses and failure statuses, and predefined completion criteria are discussed in greater detail above with respect to FIGS. 3A-3C.

It should be understood that the particular order in which the operations in FIGS. 4A-4D have been described is merely exemplary and is not intended to indicate that the described order is the only order in which the operations could be performed. One of ordinary skill in the art would recognize various ways to reorder the operations described herein.

In some embodiments, any operations of method 400 described above are performed by a storage system, the storage system including (1) non-volatile memory (e.g., comprising one or more non-volatile storage devices, such as flash memory devices), (2) one or more processors, and (3) controller memory (e.g., non-volatile memory or volatile memory in or coupled to a controller of the storage system) storing one or more programs, which when executed by the one or more processors cause the storage system to perform or control performance of any of the methods described herein.

In some embodiments, any operations of method 400 described above are performed by a storage system including means for performing any of the methods described herein.

In some embodiments, any operations of method 400 described above are performed by a storage system including (1) a plurality of storage devices, (2) one or more subsystems having one or more processors, and (3) memory (e.g., non-volatile memory or volatile memory in the storage system) storing one or more programs, which when executed by the one or more processors cause the one or more subsystems to perform or control performance of any of the methods described herein.

Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The semiconductor memory elements located within and/or over a substrate may be arranged in two or three dimensions, such as a two dimensional memory structure or a three dimensional memory structure.

The term "three-dimensional memory device" (or 3D memory device) is herein defined to mean a memory device having multiple memory layers or multiple levels (e.g., sometimes called multiple memory device levels) of memory elements, including any of the following: a memory device having a monolithic or non-monolithic 3D memory array; or two or more 2D and/or 3D memory devices, packaged together to form a stacked-chip memory device.

One of skill in the art will recognize that this invention is not limited to the two dimensional and three dimensional structures described but cover all relevant memory structures within the spirit and scope of the invention as described herein and as understood by one of skill in the art.

It will be understood that, although the terms "first," "second," etc. may be used herein to describe various elements, these elements should not be limited by these terms. These terms are only used to distinguish one element from another. For example, a first storage device could be termed a second storage device, and, similarly, a second storage device could be termed a first storage device, without changing the meaning of the description, so long as all occurrences of the "first storage device" are renamed consistently and all occurrences of the "second storage device"

are renamed consistently. The first storage device and the second storage device are both storage devices, but they are not the same storage device.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method of operating a storage device including a plurality of non-volatile memory devices, the method comprising:
   at the storage device, sending a first set of command instructions to a first device of the plurality of non-volatile memory devices, the first set of command instructions including:
      a memory operation command which, when executed, operates on the first device,
      a first status polling command to determine a status of the first device, and
      a second status polling command to determine a status of the first device;
      wherein the first status polling command is sent to the first device after the memory operation command is sent to the first device, and the second status polling command is sent to the first device after receiving a response to the first status polling command that meets predefined completion criteria; and
   forgoing sending any subsequent set of command instructions to the first device until a response to the second status polling command that meets the predefined completion criteria is received.

2. The method of claim 1, further comprising performing a remedial action in accordance with a determination that the response to the second status polling command includes a predefined error indication.

3. The method of claim 1, further comprising performing a remedial action in accordance with a determination that the response to the second status polling command includes a predefined error indication, without regard to whether the response to the first status polling command includes the predefined error indication.

4. The method of claim 2, wherein the remedial action comprises changing an operational status of a block of non-volatile memory in the first device.

5. The method of claim 1, wherein:
   sending the memory operation command to the first device comprises sending a set of one or more memory operation commands to the first device; and
   the response to the first status polling command includes a first operation completion status with respect to the set of one or more memory operation commands and a first failure status with respect to the set of one or more memory operation commands.

6. The method of claim 5, wherein the response to the second status polling command includes a second operation completion status with respect to the set of one or more memory operation commands and a second failure status with respect to the set of one or more memory operation commands; and
   wherein the response to the second status polling command meets the predefined completion criteria when (A) the second operation completion status indicates that execution of the set of one or more memory operation commands is completed, or (B) the second failure status indicates that execution of at least one of the one or more memory operation commands failed.

7. The method of claim 1, wherein sending the first status polling command to the first device comprises iteratively sending the first status polling command to the first device until the response to the first status polling command meets the predefined completion criteria.

8. The method of claim 1, wherein sending the second status polling command to the first device comprises iteratively sending the second status polling command to the first device until the response to the second status polling command meets the predefined completion criteria.

9. The method of claim 1, wherein sending the memory operation command to the first device comprises sending a set of one or more memory operation commands to the first device; and
   the method further includes:
      in accordance with a determination that the received response to the first status polling command includes a first failure status indicating that at least one memory operation command of the set of one or more memory operation commands failed; and
      in accordance with a determination that the received response to the second status polling command includes a second failure status indicating that none of the set of one or more memory operation commands failed;
      determining that the received response to the first operation status command was erroneous.

10. The method of claim 1, wherein sending the memory operation command to the first device comprises sending a set of one or more memory operation commands to the first device;
    the method further includes:
       in accordance with a determination that the received response to the first status polling command includes a first failure status indicating that none of the set of one or more memory operation commands failed; and in accordance with a determination that the received response to the second status polling command includes a second failure status indicating that at least one memory operation command of the set of one or more memory operation commands failed;

determining that the received response to the first operation status command was erroneous.

11. A storage device, comprising:

a plurality of non-volatile memory devices; and a controller coupled to the plurality of non-volatile memory devices, the controller configured to:

send a first set of command instructions to a first device of the plurality of non-volatile memory devices, the first set of command instructions including:

a memory operation command which, when executed, operates on the first device, a first status polling command to determine a status of the first device, and a second status polling command to determine a status of the first device;

wherein the first status polling command is sent to the first device after the memory operation command is sent to the first device, and the second status polling command is sent to the first device after receiving a response to the first status polling command that meets predefined completion criteria; and forgo sending any subsequent set of command instructions to the first device until a response to the second status polling command that meets the predefined completion criteria is received.

12. The storage device of claim 11, wherein the controller includes one or more modules, including a status polling module and status processing module, configured to control the sending and processing of the first status polling command and the second first status polling command.

13. The storage device of claim 11, the controller further configured to perform a remedial action in accordance with a determination that the response to the second status polling command includes a predefined error indication, without regard to whether the response to the first status polling command includes the predefined error indication.

14. The storage device of claim 12, wherein the remedial action comprises changing an operational status of a block of non-volatile memory in the first device.

15. The storage device of claim 11, wherein:

sending the memory operation command to the first device comprises sending a set of one or more memory operation commands to the first device; and the response to the first status polling command includes a first operation completion status with respect to the set of one or more memory operation commands and a first failure status with respect to the set of one or more memory operation commands.

16. The storage device of claim 11, wherein sending the first status polling command to the first device comprises iteratively sending the first status polling command to the first device until the response to the first status polling command meets the predefined completion criteria.

17. The storage device of claim 11, wherein sending the memory operation command to the first device comprises sending a set of one or more memory operation commands to the first device; and the controller is further configured to:

in accordance with a determination that the received response to the first status polling command includes a first failure status indicating that at least one memory operation command of the set of one or more memory operation commands failed; and in accordance with a determination that the received response to the second status polling command includes a second failure status indicating that none of the set of one or more memory operation commands failed;

determine that the received response to the first operation status command was erroneous.

18. The storage device of claim 11, wherein sending the memory operation command to the first device comprises sending a set of one or more memory operation commands to the first device; and the controller is further configured to:

in accordance with a determination that the received response to the first status polling command includes a first failure status indicating that none of the set of one or more memory operation commands failed; and in accordance with a determination that the received response to the second status polling command includes a second failure status indicating that at least one memory operation command of the set of one or more memory operation commands failed;

determine that the received response to the first operation status command was erroneous.

19. A non-transitory computer-readable storage medium, storing one or more programs for execution by a storage device with one or more processors, the one or more programs including instructions for:

sending a first set of command instructions to a first device of the plurality of non-volatile memory devices, the first set of command instructions including:

a memory operation command which, when executed, operates on the first device, a first status polling command to determine a status of the first device, and a second status polling command to determine a status of the first device;

wherein the first status polling command is sent to the first device after the memory operation command is sent to the first device, and the second status polling command is sent to the first device after receiving a response to the first status polling command that meets predefined completion criteria; and forgoing sending any subsequent set of command instructions to the first device until a response to the second status polling command that meets the predefined completion criteria is received.

20. The storage medium of claim 19, the one or more programs further including instructions for performing a remedial action in accordance with a determination that the response to the second status polling command includes a predefined error indication, without regard to whether the response to the first status polling command includes the predefined error indication.

21. The storage medium of claim 20, wherein the remedial action comprises changing an operational status of a block of non-volatile memory in the first device.

22. The storage medium of claim 19, wherein:

sending the memory operation command to the first device comprises sending a set of one or more memory operation commands to the first device; and the response to the first status polling command includes a first operation completion status with respect to the set of one or more memory operation commands and a first failure status with respect to the set of one or more memory operation commands.

23. The storage medium of claim 19, wherein sending the first status polling command to the first device comprises iteratively sending the first status polling command to the first device until the response to the first status polling command meets the predefined completion criteria.

24. The storage medium of claim 19, wherein sending the memory operation command to the first device comprises sending a set of one or more memory operation commands to the first device; and the one or more programs further include instructions for:
        in accordance with a determination that the received response to the first status polling command includes a first failure status indicating that at least one memory operation command of the set of one or more memory operation commands failed; and
        in accordance with a determination that the received response to the second status polling command includes a second failure status indicating that none of the set of one or more memory operation commands failed;
        determining that the received response to the first operation status command was erroneous.

25. The storage medium of claim 19, wherein sending the memory operation command to the first device comprises sending a set of one or more memory operation commands to the first device; and the one or more programs further include instructions for:
        in accordance with a determination that the received response to the first status polling command includes a first failure status indicating that none of the set of one or more memory operation commands failed; and
        in accordance with a determination that the received response to the second status polling command includes a second failure status indicating that at least one memory operation command of the set of one or more memory operation commands failed;
        determining that the received response to the first operation status command was erroneous.

\* \* \* \* \*